United States Patent

Collins

[11] Patent Number: 5,746,074
[45] Date of Patent: May 5, 1998

[54] LOCKING MECHANISM FOR LAWN MOWERS

[76] Inventor: William V. F. Collins, 406 Sena Dr., Metairie, La. 70005

[21] Appl. No.: 707,129

[22] Filed: Sep. 3, 1996

[51] Int. Cl.⁶ .................................................. E05B 73/00
[52] U.S. Cl. .................................... 70/18; 70/14; 70/61
[58] Field of Search ........................... 70/14, 15, 18, 70/456 R, 61

[56] References Cited

U.S. PATENT DOCUMENTS

| 85,402 | 12/1868 | Riley | 70/18 |
|---|---|---|---|
| 105,105 | 7/1870 | McIlhenny | 70/18 |
| 130,872 | 8/1872 | Runquist | 70/18 |
| 169,443 | 11/1875 | Houston | 70/16 |
| 187,362 | 2/1877 | Dilg | 70/18 |
| 188,540 | 3/1877 | Quackenbush | 70/18 |
| 256,079 | 4/1882 | Trackwell | 70/18 |
| 1,326,688 | 12/1919 | Perry | 70/18 |
| 1,386,543 | 8/1921 | Tiller | 70/14 |
| 1,396,091 | 11/1921 | Barwick | 70/18 |
| 1,530,622 | 3/1925 | Roberts | 70/18 |
| 1,652,233 | 12/1927 | Branick | 70/61 |
| 1,713,230 | 5/1929 | Hunt | 70/61 |
| 2,133,883 | 10/1938 | Aubert | 70/58 |
| 2,497,797 | 2/1950 | Rogers | 70/61 |
| 4,057,983 | 11/1977 | Morgan | 70/58 |
| 4,216,665 | 8/1980 | McKelvey | 70/58 |
| 4,286,444 | 9/1981 | Grudich | 70/61 |
| 4,286,445 | 9/1981 | Sills | 70/455 |
| 4,524,872 | 6/1985 | Chamberlain | 70/61 |
| 4,768,358 | 9/1988 | Viola et al. | 70/58 |
| 5,193,366 | 3/1993 | Brinkman | 70/18 |
| 5,359,866 | 11/1994 | Boddy | 70/18 |
| 5,363,677 | 11/1994 | Cox | 70/18 |

*Primary Examiner*—Steven N. Meyers
*Assistant Examiner*—Tuyet-Phuong Pham
*Attorney, Agent, or Firm*—Pravel, Hewitt, Kimball & Krieger

[57] ABSTRACT

A lock mechanism for push lawn mowers of the type having a secondary operations handle which must be moved into a position adjacent the lawn mower handle in order to engage the starting mechanism of the lawn mower, the apparatus comprising at least a first and second body members joined at a hinged portion, each body member formed into a substantial semi-circular pattern for defining a channel in each body member, so that as the body members are moved from the open to the closed position, the channels would define a circular bore through the body members that would encircle the primary handle of the lawn mower; a tab at the end of each of the body members, a tab having an opening there through, so that when the body members are closed, the openings in the tab align for accommodating a padlock therethrough, the body members once engaged around the handle of the lawn mower define a barrier which the second handle would engage when pulled towards the primary handle, so that the secondary handle is prevented from moving adjacent and against the primary handle and therefore avoiding the starting of the lawn mower.

12 Claims, 2 Drawing Sheets

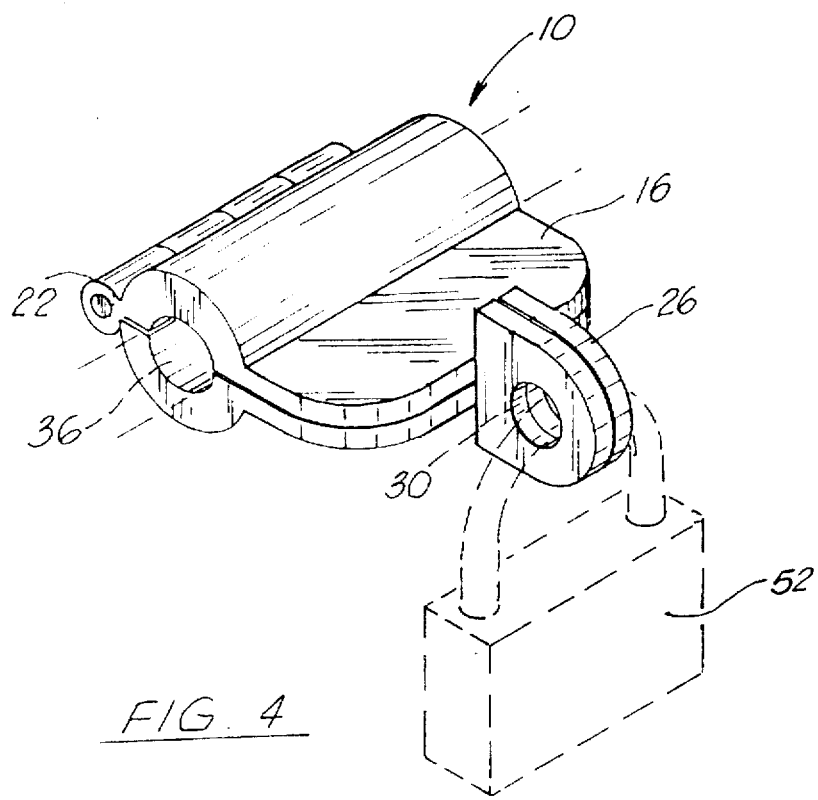
FIG. 4
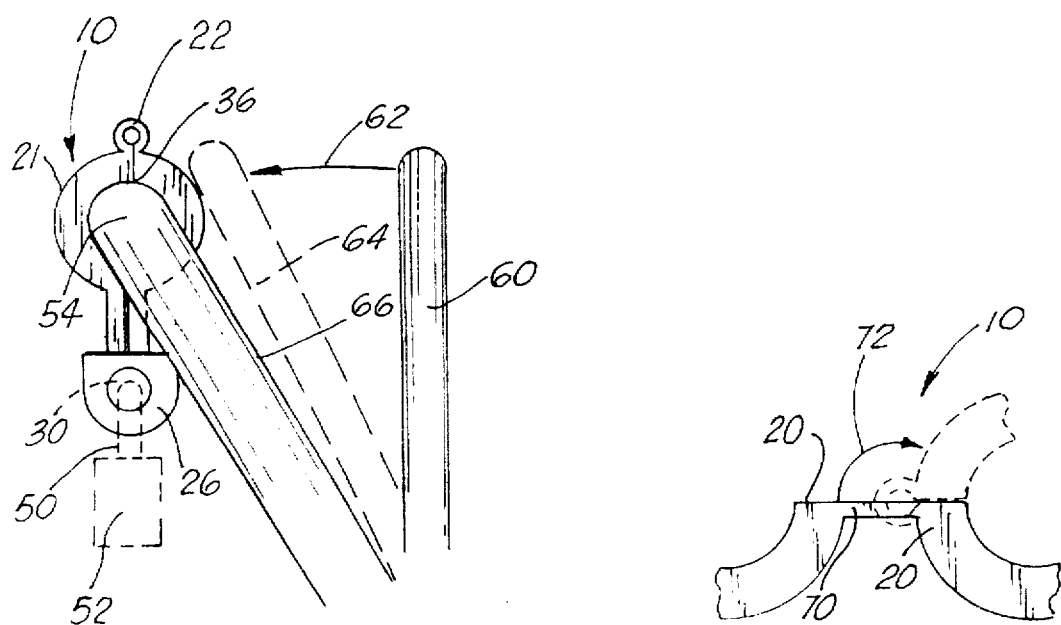
FIG. 5
FIG. 6

5,746,074

LOCKING MECHANISM FOR LAWN MOWERS

BACKGROUND OF THE INVENTION

1. Field of the Invention

The apparatus of the present invention relates to lawn mower safety. More particularly, the present invention relates to a locking mechanism which is secured to the primary handle of a push lawn mower, for assuring that the secondary starting handle cannot be engaged against the primary handle and the lawn mower cannot be inadvertently started while the locking mechanism is in place.

2. General Background

In the area of lawn mowers, particularly the push type which are gas operated, there is a constant need to improve the safety features of the lawn mower to avoid inadvertent accidents which could have tragic results. It is well known that there are various guards or shielding mechanisms on lawn mowers for avoiding rocks or the like from being contacted by the rotating blade and being flung out of the lawn mower that may damage property or worse yet, injure people. Another area of safety which has recently been employed on push lawn mowers, is a secondary starting handle which is normally set adjacent the primary push handle, so that when the secondary handle is brought in close contact with the push handle, then and only then can the lawn mower be started with the pull cord or with the automatic starter. The secondary handle must be maintained in engagement next to the primary handle during the cutting process. At any time should the secondary handle be released and returned to its original position, this will automatically kill the lawn mower and the lawn mower cannot be restarted until such time as the secondary handle is re-engaged in the starting and operating position.

One of the potential hazards in such a feature, is that although it is a safety feature against a lawn mower not being able to start or continuing to operate when the secondary handle is not engaged, is the fact that a young person such as child may engage the secondary handle against the lawn mower primary handle, and by doing so, the lawn mower can be started up by the child which would be undesirable. For example, if children are playing in a carport or the like, and one of the children engages the starting secondary handle against the primary handle, and the second child would pull on the starting cord, it may well be that the lawn mower could begin to operate, with the blade in full power rotation so that if the child should place his hand or foot underneath the base, there could be a tragic result. Therefore, such a device for avoiding such an inadvertent starting of the lawn mower is needed in the art.

The patents which are pertinent to this invention are listed in the prior art statement which will accompany this application.

SUMMARY OF THE PRESENT INVENTION

The apparatus of the present invention solves the problems in the art in a simple and straight forward manner. What is provided is a lock mechanism for push lawn mowers of the type having a secondary operations handle which must be moved into a position adjacent to the primary lawn mower push handle in order to engage the starting mechanism of the lawn mower, the apparatus comprising at least first and second body members joined at a hinged portion, each body member including a substantially semi-circular portion for defining a channel in each body member, so that as the body members are moved from the open to the closed position, the channel would define a circular bore through the body members that would encircle the primary handle of the lawn mower; a tab at the end of each of the body members, the tabs having an opening therethrough, so that when the body members are closed, the openings in the tabs align for accommodating a padlock therethrough; the body members once engaged around the handle of the lawn mower defining a barrier which the secondary handle would contact when pulled towards the primary handle, so that the secondary handle is prevented from moving adjacent and against the primary handle and therefore avoiding the starting of the lawn mower.

It is therefore a principal object of the present invention to provide a locking member for a lawn mower, so that when engaged around the primary handle of the lawn mower, the secondary starting handle is prevented from moving in a position sufficiently adjacent to the primary handle so as to allow the lawn mower to start;

It is a further object of the present invention to provide a removable locking mechanism for the handle of the lawn mower which can be secured around the handle and locked with a padlock, and would define a barrier between the primary handle and a secondary starting handle so that the secondary starting handle cannot move sufficiently close to the primary handle in order to allow the lawn mower to start;

It is a further object of the present invention to provide an apparatus for engaging around the primary handle of a lawn mower which is hinged along its center line, and which can accommodate a padlock through a second end of the mechanism serving as a barrier against the starting or operating handle of the lawn mower to be engaged against or next to the primary handle of the lawn mower.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 4 illustrates an overall view of the apparatus of the present invention i the locked configuration;

FIG. 5 illustrates a side view of the preferred embodiment of the apparatus of the present invention engaged around the primary handle of the lawn mower with a padlock there through; and FIG. 6 illustrates a partial view of a second embodiment of the locking mechanism of the apparatus of the present invention.

DETAILED DESCRIPTION OF THE PREFERRED EMBODIMENT

Figure 1:
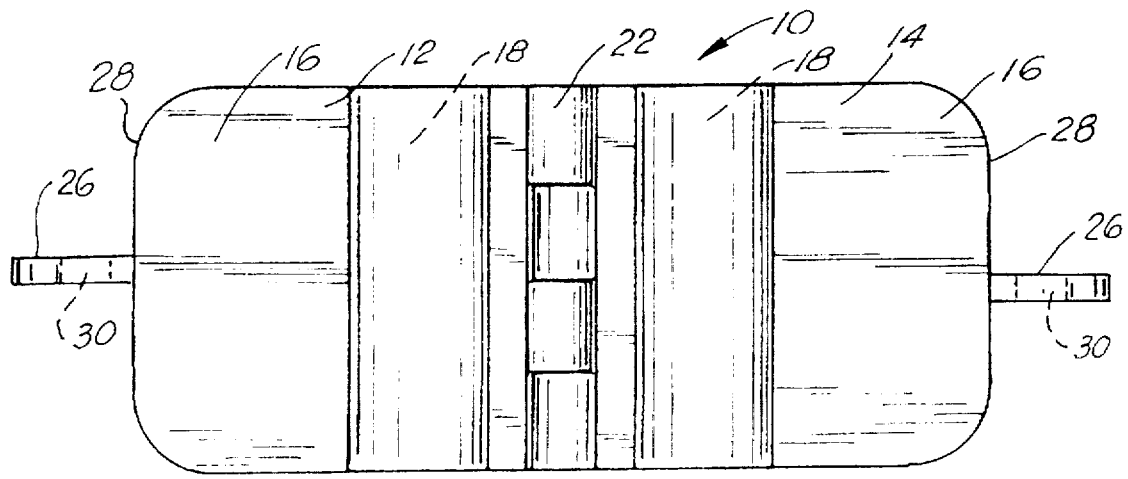
FIG. 1 illustrates an overall top view of the preferred embodiment of the apparatus of the present invention.

FIGS. 1–5 illustrate the preferred embodiment of the apparatus of the present invention, with FIG. 6 illustrating a second embodiment. Turning now to the principal embodiment as seen particularly in FIG. 1, there is first illustrated a locking apparatus 10 having a first body portion 12 and a second identical body portion 14, each of the body portions 12 and 14 having an overall front face 16 with each front face 16 having a channel 18 formed therein. The channel 18 defined by a semi-circular portion 20 formed in each of the body portions 12 and 14. Channels 18 formed therein can be seen in side view in FIG. 2. Further, as seen in FIG. 1, there is illustrated a central hinge member 22 having a hinge pin 24 which would be slid through hinge rings 23 as seen in exploded view in FIG. 3, for operation of the hinge member 22. Further as seen in FIG. 1, each body portion 12, 14 would include an end tab 26, each of the end tabs 26 formed on the outer edge 28 of each of the body members 12, FIG. 4, and rotated 90 degrees from the plane of the body members for easily locking the apparatus. Each of the tabs 26 include a bore 30 therethrough for accommodating the lock member 50 of a padlock 52 as illustrated in FIGS. 4 and 5.

Figure 2:
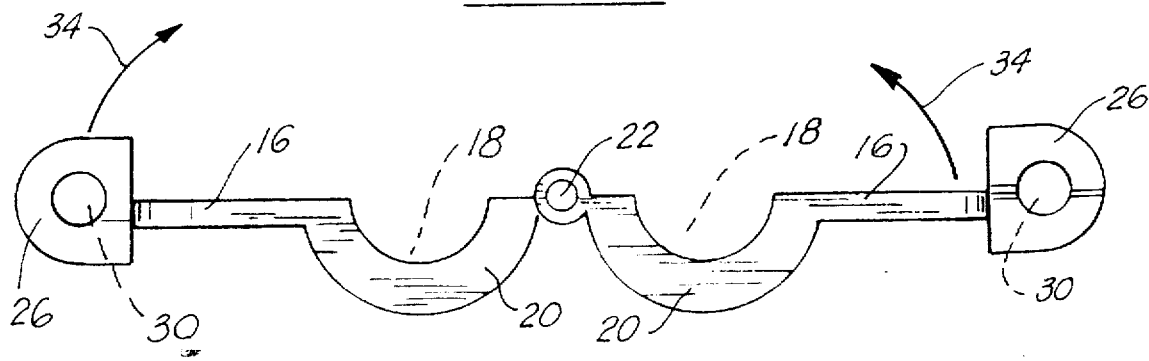
FIG. 2 illustrates a side view thereof.

As seen in side view in FIG. 2, the body members 12, 14, because of the central hinge portion 22, are able to move each in the direction of arrows 34 as seen in FIG. 2 to move from the first opened position, as seen in FIG. 2, to a closed position, as seen in FIG. 4. Therefore, when the body members are moved from the open position as seen in FIG. 2 to the closed position in FIG. 4, each of the semi-circular channels 18 would define a circular bore 36 through the closed body members 12, 14, the bore 36 being of sufficient diameter so as to accommodate in general, a normal diameter of a primary handle 54 of a push lawn mower. The primary handle 54, is of course, the handle member that is found on all lawn mowers having a pair of upright members whose ends are attached to the lawn mower base, and are spaced apart by an upright cross member upon which the person who is pushing the lawn mower grasps in order to push the lawn mower along. As noted in FIG. 5, a side view of primary handle 54 of a lawn mower is shown with the apparatus 10 engaged around the handle in the closed position as seen in FIG. 4, having a padlock 52, secured with the locking member 50 engaged through the bore 30 of the apparatus 10.

Figure 3:
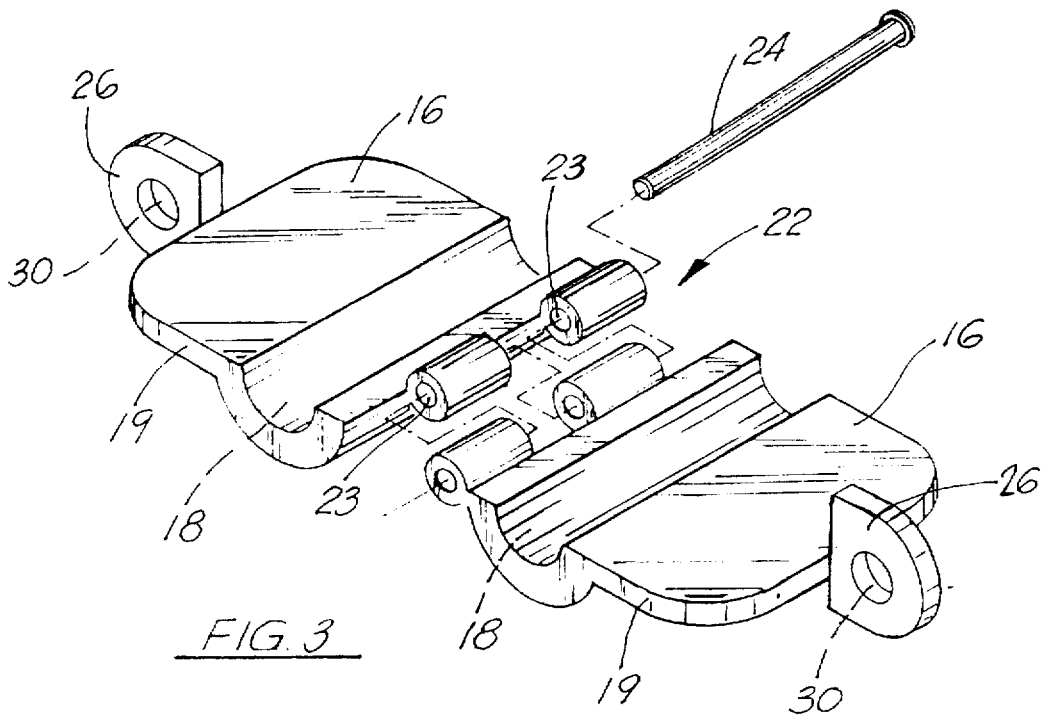
FIG. 3 illustrates an exploded view of the two body components of the apparatus of the present invention.

Again, making reference to the FIGURES, particularly in FIG. 3, it is seen where the central hinge portion 22 is accommodating the hinge pins 24 through the hinge rings 23 to serve as a means for allowing the body members 12, 14 to move from the open position as seen in FIG. 2 to the fully closed position as seen in FIGS. 4 and 5. Again making reference to FIG. 5, the locking mechanism 10 as seen and was discussed earlier, is secured around the handle 54 of a lawn mower. In this position, the thickness of each of the channel walls 19 of body portions 20 which would define the bore 36 therethrough would serve to be engaged around the handle 54. While engaged around handle 54, there is further illustrated a secondary starting handle 60, which is a typical type of secondary handle which must be moved from the position as seen in full view in FIG. 5 to the position along arrow 62 as seen in phantom view in 64. As it is moved along that path 62, in normal conditions, handle 60 would be able to move directly against the surface 66 of handle 54, and while held in that position, the lawn mower could be started and operated. However, once the handle 60 is moved away from the surface 66 of principal handle 54, the lawn mower would automatically kill, and could not be restarted until the handle 60 is returned to adjacent surface 66 of handle 54. That being the case, once the locking mechanism 10 is in place as seen in FIG. 5, handle 60, as seen in phantom view 64 has been moved and makes contact with the outer surface 21 of the walls 19 of portion 20 semi-circular portions 20 of each of the bodies 12, 14. At this point, handle 60 cannot move any further in its position as seen in view 64 and by being in that position, is not sufficiently adjacent handle 54 in order to allow the lawn mower to start up. Therefore, the locking member as seen in FIG. 5, is defining that means which would prevent secondary starting handle 60 from moving adjacent or contacting surface 66 of handle 54, and therefore would serve to prevent the lawn mower from being cranked by a child or the like.

Of course, if an adult wishes to operate the lawn mower, one would simply remove lock 52 from locking mechanism 10, open the hinged portion 22 of the mechanism, remove it from lawn mower handle 54 and upon squeezing secondary handle 60, along arrows 62, the secondary handle 60 would then move in the position to start the lawn mower.

Turning now to FIG. 6, there is illustrated a second embodiment of the apparatus 10. The single difference between the apparatus as seen in FIG. 6 and as seen in FIGS. 1–5 is the fact that rather than have a hinged portion 22 with the hinged rings 23 and the pin 24 which goes therethrough, there is simply illustrated a central area 70 which extends from one semi-circular surface 20 to the second semi-circular surface 20. Because of the fact that area 70 has a reduced thickness, it is able to then bend along its length, in the direction of arrow 72, to move from the opened position as seen in FIG. 6 to the closed position as seen in FIGS. 4 and 5. By using this secondary embodiment of the invention, one would simply be eliminating the hinged area 22 with the pin 24 and would have a simplified version of the locking mechanism which may be easy to manufacture and less expensive. For manufacturing purposes, the apparatus could be injection molded plastic, metal, wood or a combination of these.

The following table lists the part numbers and part descriptions as used herein and in the drawings attached hereto.

| PARTS LIST | |
| --- | --- |
| Description | Part No. |
| locking apparatus | 10 |
| first body portion | 12 |
| second body portion | 14 |
| front face | 16 |
| channels | 18 |
| walls | 19 |
| semi-circular portion | 20 |
| outer surface | 21 |
| central hinge member | 22 |
| hinged rings | 23 |
| hinge pin | 24 |
| end tab | 26 |
| outer edge | 28 |
| bore | 30 |
| arrow | 34 |
| circular bore | 36 |
| lock member | 50 |
| padlock | 52 |
| primary handle | 54 |
| secondary starting handle | 60 |
| arrow | 62 |
| phantom view | 64 |
| surface | 66 |
| central area | 70 |
| arrow | 72 |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A locking apparatus in combination with a push lawn mower of the type comprising:
   a) a primary handle;
   b) a secondary handle starting handle which is movable to a position adjacent the primary handle, so that the lawn mower may be started and operated;
   c) the locking apparatus comprising:
      i) a first body member, having a semi-circular portion, defining a semi-circular channel therethrough;
      ii) a second body member, having a semi-circular portion, and also defining a semi-circular channel therethrough;
      iii) a connection portion along a centerline of the first and second body portions for allowing the body portions to move from an open position, to a close position, so that while in the closed position the channels align and together define a circular bore through the closed body portions;
      iv) bores in each ends of the body member for securing a lock through the bores, when the apparatus is positioned around the primary handle of the lawn mower, so that the starting handle makes contact with the locking apparatus and cannot be moved adjacent the primary handle in order to prevent starting of the lawn mower.

2. The locking apparatus in claim 1, further comprising a tab portion on each end of the first and second body members, through which the bores are formed to accommodate the lock therethrough.

3. The locking apparatus in claim 1, wherein the portion between the two body portions is a hinge connection formed in the body members with a hinge pin therethrough.

4. The locking apparatus in claim 1, wherein the channels defining the bore when the locking apparatus is closed, defines the pathway of the primary handle when the apparatus is secured around the lawn mower handle.

5. The locking apparatus in claim 1, wherein the locking members may be formed from injection molded plastic, wood, metal or combination thereof.

6. A locking apparatus in combination with a push lawn mower of the type comprising:
   a) a primary lawn mower handle, having a pair of upright members joined at their top ends by a cross member;
   b) a secondary starting handle member, movable from a position apart from the primary handle, to a position substantially against the primary handle, so that a lawn mower starter can be engaged;
   c) the locking apparatus further comprising:
      i) a first body member, having a semi-circular portion, defining a channel therethrough;
      ii) a second body member, having a semi-circular portion, defining a channel therethrough;
      iii) a hinged portion along a centerline of the first and second body portions for allowing the body portions to move from an open position, to a closed position, so that the channels are aligned to define a circular bore through the closed body portions;
   d) the first and second body members engaged around the cross member of the primary handle, so that the cross member rests in the bore defined by the semicircular channels;
   e) bores formed in each of the first and second body members, which are aligned adjacent one another when the body members are moved to the closed position, to accommodate a lock therethrough; and
   f) the engaged body members defining a barrier between the primary handle and the secondary starting handle for disallowing the starting handle to move adjacent the primary handle and to prevent the starting of the lawn mower.

7. The locking apparatus in claim 6, further comprising a tab portion on each end of the first and second body members, through which the bores are formed to accommodate the lock therethrough.

8. The locking apparatus in claim 6, wherein the body members may be formed from injection molded plastic, wood, metal or a combination thereof.

9. The locking apparatus in claim 6, wherein the hinged portion defines a series of hinge elements through which a hinge pin engages to define the hinged portion.

10. The locking apparatus in claim 6, wherein the body members are of sufficient thickness to prevent the starting handle from being positioned sufficient close to the primary handle for starting the lawn mower.

11. A locking apparatus, in combination with:
   a) a push lawn mower, of the type comprising:
      i) a primary handle, and a secondary starting handle which is moveable to a position adjacent the primary handle, so that the lawn mower may be started and operated;
   b) the locking apparatus comprising:
      i) a first body member, having a semi-circular portion, defining a channel therethrough;
      ii) a second body member, having a semi-circular portion, defining a channel therethrough;
      iii) a connection portion along a centerline of the first and second body portions for allowing the body portions to move from an open position, to a closed position, so that each channel defines together a circular bore therethrough;
      iv) bores in each of the body members for securing a lock through the bores, when the apparatus is positioned around the primary handle of the lawn mower, in a position so that the starting handle makes contact with the primary handle, and cannot be moved adjacent the primary handle, avoiding starting of the lawn mower.

12. The locking apparatus in claim 11, wherein the connection portion along the centerline of the first and second body portions is of a reduced thickness of the body portions for allowing moving of the body portions between open and closed positions.

* * * * *